United States Patent [19]

Ishida et al.

[11] Patent Number: 4,830,434
[45] Date of Patent: May 16, 1989

[54] ADJUSTABLE HEAD REST DEVICE FOR VEHICLE

[75] Inventors: Keiichi Ishida; Takami Terada, both of Toyota, Japan

[73] Assignee: Aisin Seiki Kabushiki Kaisha, Kariya, Japan

[21] Appl. No.: 66,611

[22] Filed: Jun. 26, 1987

[30] Foreign Application Priority Data

Jun. 28, 1986 [JP] Japan .................................. 61-152132

[51] Int. Cl.$^4$ .............................................. A47C 7/36
[52] U.S. Cl. ....................................... 297/408; 297/410
[58] Field of Search ................. 297/408, 410; 248/394

[56] References Cited

U.S. PATENT DOCUMENTS

| | | | |
|---|---|---|---|
| 2,132,009 | 10/1938 | Ball | 248/394 |
| 3,542,428 | 11/1970 | Colucci | 297/410 |
| 3,592,508 | 7/1971 | Druseikis | 297/410 |
| 4,304,439 | 12/1981 | Terada et al. | 297/410 |
| 4,678,232 | 7/1987 | Ishida et al. | 297/408 |

*Primary Examiner*—Francis K. Zugel
*Attorney, Agent, or Firm*—Finnegan, Henderson, Farabow, Garrett & Dunner

[57] ABSTRACT

An adjustable head rest device for a vehicle seat comprises a head rest body for supporting the head of an occupant of the seat. The device further includes an adjusting member for adjusting the position of the head rest body with respect to the seat continuously within a defined range of movement.

3 Claims, 5 Drawing Sheets

1

ADJUSTABLE HEAD REST DEVICE FOR VEHICLE

BACKGROUND OF THE INVENTION

1. Field of the INvention

This invention generally relates to a head rest adapted for use on a vehicle seat back, and more particularly to an adjustable head rest device.

2. Statement of the Prior Art

Recently in the automobile industry, vertically movable head rest devices have been developed and one of them is disclosed in a Japanese Patent application published in 1985 as Jikkai-No. sho 60-167558. Such head rest, as shown in FIGS. 5 and 6, comprises stay 1001 embedded in a seat back 1000, guide shoe member 1002 slidably inserted into the stay, head rest body 1003 provided in the guide shoe and a lock mechanism 1005 for locking the sliding movement of the shoe member at selected portions. The lock mechanism of this type includes a plurality of detent teeth 1010 formed on the stay and an operating portion 1020 having detent member 1021 engageable with and disengageable from the detent teeth. Each of the detent teeth 1010 comprise flat portions 1010a and grooved portions 1010b.

In this prior art head rest device, a desired position of the head rest is obtained from the following steps:

adjusting the head rest body to a desired position relative to the seat back operating the operation portion to engage the detent member with any of the detent teeth, thus locking the head rest body to the stay.

The above prior art head rest device, however, has a drawback in that it cannot carry out a fine adjustment due to the structure of the locking mechanism. As is shown in FIG. 6, when the detent member is on the flat portion of the detent teeth, the adjustment can only be performed by the length L (which corresponds to the length of a flat portion 1010a of one of the detent teeth 1010).

SUMMARY OF THE INVENTION

It is, therefore, an object of the present invention to provide an improved head rest device which can obviate the above prior art drawbacks.

It is another object of the present invention to provide an improved vertically movable head rest device for vehicles which has a fine vertical adjustment function.

It is a further object of the invention to provide an improved head rest device which includes a stay embedded in the seat back, a guide shoe slidably provided on the stay, a head rest body on the guide shoe, and a shoe drive mechanism provided on one of the stay, guide shoe and head rest body for continuously sliding the shoe relative to the stay for locking the shoe to any desired position on the stay.

It is a further object of the invention to more finely adjust the position of a head rest.

It is another object of the invention to adjust the position of a head rest continuously within a defined range of movement.

Additional objects and and advantages will be obvious from the description, or may be learned by practice of the invention.

To achieve the foregoing objects and advantages, the adjustable head rest device of the present invention comprises a head rest body for supporting the head of an occupant of the seat and means for adjusting the position of the head rest body with respect to the seat continuously within a defined range of movement.

Preferably, the adjusting means includes drive means for moving the head rest body relative to the seat.

It is also preferred that the drive means includes locking means for locking the head rest body in a desired position within the defined range.

It is also preferred that the drive means includes at least one stay member extending between the seat and the head rest body for slidable movement of the head rest body thereon with respect to the seat.

It is also preferred that the stay member includes a rack portion and the drive means also includes pinion gear means for interacting with the rack portion, rest body thereon with respect to the seat.

It is also preferred that the pinion gear means includes a pinion gear and a manually rotatable knob for actuating the pinion gear.

It is also preferred that the pinion gear means also includes coupling means for movement of the head rest body within the defined range only in response to rotation of the rotatable knob. It is also preferred that the coupling means includes a spring coupler between the pinion gear and the drive means. It is also preferred that the device includes angular adjustment means for adjusting the angle of the head rest body with respect to the seat within a second defined angular range.

BRIEF DESCRIPTION OF THE DRAWINGS

The accompanying drawings, which form a part of the specification, illustrate a preferred embodiment of the invention and together with the description, serve to explain the invention.

Figure 1:
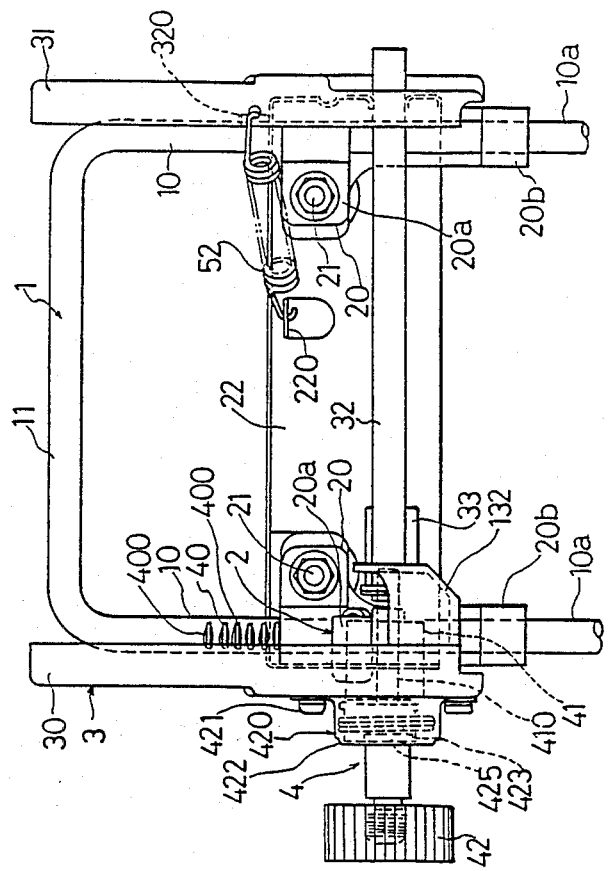
FIG. 1 shows a front view of an embodiment of the invention.
Figure 2:
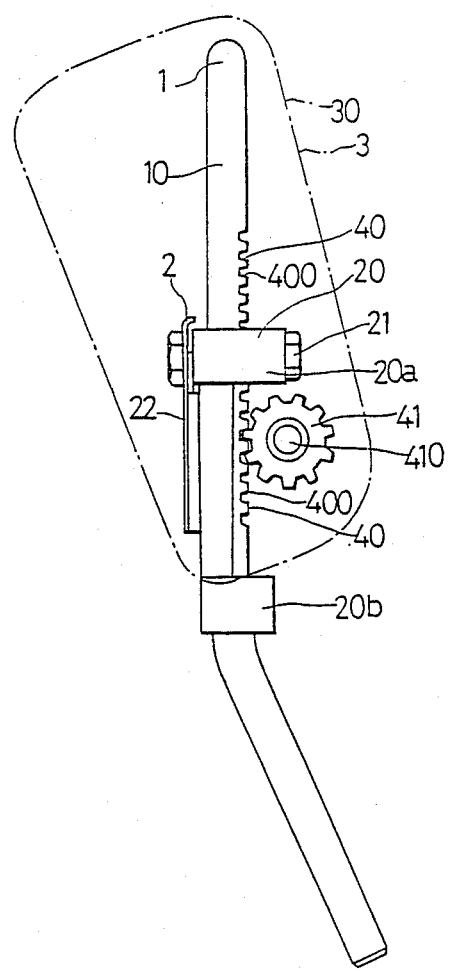
FIG. 2 shows a patial cutaway side view of the embodiment of the invention in FIG. 1 with some parts thereof removed for clear understanding of the main features of the invention.

DETAILED DESCRIPTION OF THE PREFERRED EMBODIMENT OF THE INVENTION:

Reference will now be made in detail to the present preferred embodiment of the invention, examples of which are illustrated in the accompanying drawings.

Referring to the attached drawings, particularly in FIGS. 1 to 4, the head rest device of the invention is used in the seat of an automobile and includes a stay 1, a pair of guide shoes 2, a head rest body 3 and a driving structure 4.

The stay 1 is formed from a metal pipe shaped generally as a U and includes a pair of lateral portions 10 and a bar portion 11 connecting the two lateral portions 10. The lower end portions 10a of the lateral portions 10 are for connectiong with a seat back of an automobile (not shown).

Figure 4:
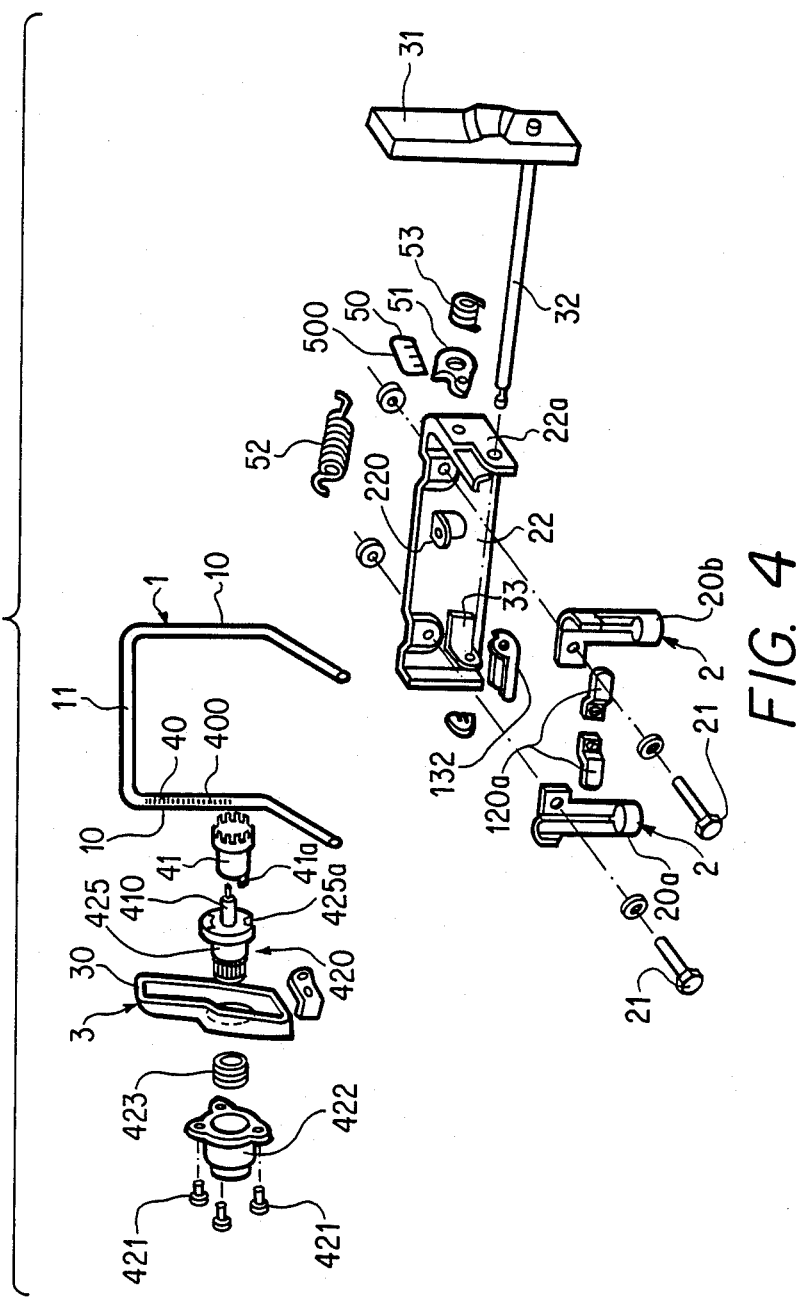
FIG. 4 shows a perspective and exploded view of the preferred embodiment of the invention.
Figure 5:
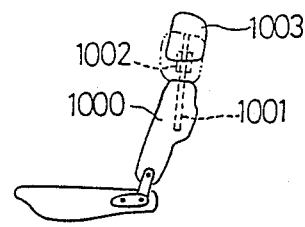
FIG. 5 shows a prior art head rest device adapted to a vehicle seat.
Figure 6:
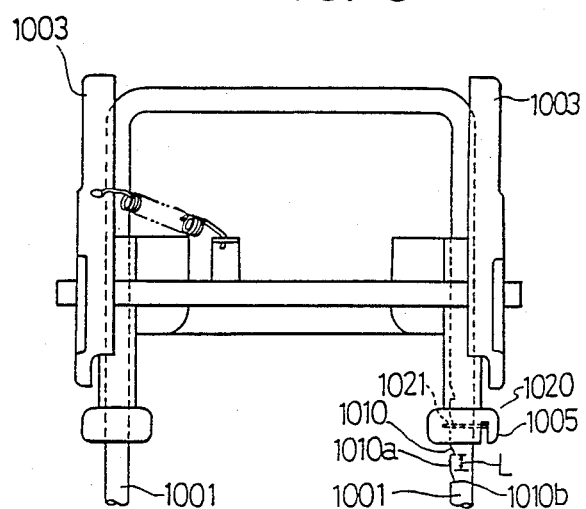
FIG. 6 shows a side view of the prior art head rest device.

The guide shoes 2 include a pair of shoe bodies 20 and a bracket 22 connecting the two shoe bodies 20 by bolts 21. Thus the two shoes 2 are movable integrally with each other. A recessed portion 220 is provided in the bracket 22, as is shown in FIG. 4, for receiving therein one end of a coil spring 52, which will be explained later. Each shoe body 20 includes a first cylinder portion 20a and a second cylinder portion 20b.

The head rest body 3 includes a first movable bracket 30, a second movable bracket 31, a rod portion 32 connecting the first and second movable brackets 30, 31, and a securing portion 33 rotatably mounted on the rod portion 32. The head rest body 3 is fixed to the bracket 22 and, accordingly, to the shoes 2 through the securing portion 33. The left end of the rod portion 32 as viewed in FIG. 1, is secured to the first movable bracket 30 through bracket 132. The right end of the rod portion 32 bears on the end portion 22a of the bracket 22. Accordingly, when the guide shoes 2 are moved along the lateral portions 10 of the stay 1, the head rest body 3 is also moved along the lateral portions 10 integrallly with the guide shoes 2.

The drive structure 4 is disposed between the stay 1 and head rest body 3 and includes a rack portion 40 formed on one of the lateral portion 10 of the stay 1, pinion gear 41 rotatably mounted on the first movable bracket 30 of the head rest body 3, and an operating knob 42 connected to a shaft 410 on which the pinion gear 41 is rotatably mounted.

The rack portion 40 has a series of teeth 400 formed on the lateral portion 10 of the stay. The teeth are formed equidistant from one another extending vertically. The pinion gear 41 is engageable with the teeth 400 to be moved vertically along the lateral portion 10. The operating knob 42 is connected to drive member 425 having the shaft 410. When the knob is operated manually, the pinion gear 41 is rotated to be moved along the rack portion 40 through a spring coupler 420, which will be explained hereinafter.

The spring coupler, which prevents idle rotation, includes a U-shaped cover portion 422 secured to the first movable bracket 30 by bolt 421, and a torsion coil spring 423. The torsion coil spring 423 is in frictional contact at its outer surface with the inner surface of the cover portion 422 and is disposed between the engaging portion 41a of the pinion gear 41 and the engaging portion 425a of the drive member 425.

When the knob 42 is rotated, the drive member 425 is rotated to engage the end portion of the torsion coil spring 423 to compress the diameter of the spring 423. Thus the frictional engagement between the cover portion 422 and the torsion coil spring is released. The engagement between the two engaging portions 425a and 41a rotates the pinion gear 41 thereby allowing the torsion coil spring 423 to be engaged with the engaging portion 41a to expand the diameter of the spring 423. This recovers the frictional engagement between the spring 423 and the inner surface of the cover portion 422.

The second movable bracket 31 may be provided with a reclining structure 5 which keeps a desired reclining degree of the head rest body 3 with respect to the stay 1. The reclining structure 5 includes engaging portion 50 having a plurality of equally separated teeth 500, a detent 51 engageable with one of teeth 500, an arm 51b, a shaft 51a mounted on the end 22a of the bracket 22, a coil spring 53 biasing the detent 51 toward teth 500 and the coil spring 52 provided between the recessed portion 220 of the bracket 22 and a recessed portion 320 of the second movable bracket 31 for biasing the head rest in the rear direction. The coil spring 53 is a type of turn-over spring which turns over when the load applied reaches a preset level. The engaging portion 50 has a pair of projections P and Q at both end portions. When the head rest body 3 is swung around the rod portion 32 to shift the head rest to the frontmost position, the detent 51 is engaged with teeth 500a, 500b, 500c, 500d and 500e and finally with the projection P. When the head rest body is further rotated in direction B in FIG. 3, the projection P pushes the detent 51 to rotate the detent 51 around the pin 51a. This forces the spring 53 through arm portion 51b. When the force applied to the spring 53 exceeds the turn-over point, the coil spring 53 turns over to release the engagement between the detent 51 and the engaging portion 50. Under this situation, the head rest body 3 is swingable around the rod portion 32 relative to the stay 1, which is secured to the seat back. Thus the head rest body 3 can be shifted to the rear-most position.

When the head rest body 3 is shifted to the rear-most position, the projection Q is engaged with the detent 51 to be rotated in the opposite direction to arrow B around the pin 51a. Thus the force direction of the spring 53 is returned to the normal and the detent 51 is engageable with the teeth 500. Under this situation, when the head rest body 3 is swung in direction of arrow A in FIG. 3, The detent 51 is engaged with teeth 500a–500e, successively.

When the knob 42 is manually rotated to change the head rest position relative to the seat back, the pinion gear 41 is rotated to be moved along the rack portion 40 of the stay 1. Since the stay 1 is secured to the seat back, the position of the rack portion does not change. Thus, the pinion gear 41 is moved vertically together with the head rest body 3. This vertical movement of the head rest body 3 caused by the rotation of the operating knob 42 can shift the head rest device to a desired position continuously with a fine adjustment in accordance with the position of the head of the seat occupant. Because of the installment of the spring coupler 420, the knob 42 keeps its position even when the hand or fingers are released from the knob 42 on the way.

Figure 3:
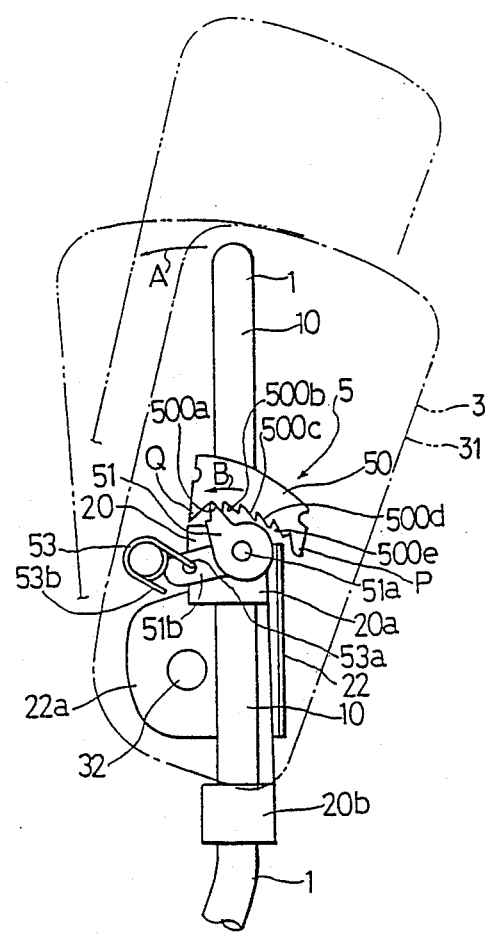
FIG. 3 shows a second partial cutaway side view of FIG. 1; side view similar to FIG. 2 with another side removed other parts

When the head rest body 3 is to be reclined relative to the seat back in the A arrow direction in FIG.3, the operator only has to pull the head rest body 3 with his fingers or hands. Then the engaging portion 50 pushes the detent 51 in B direction and the detent 51 is swung around the shaft 51a in the direction B overcoming the spring force of spring 53. This releases the engagement between the detent 51 and the tooth 500a. When the head rest body 3 is further moved in the arrow of A direction, the engagement of the detent 51 is released from the teeth 500b, 500c 500d, and 500e. Under this situation, the head rest 3 is swung to recline to a desired position and the detent 51 is forced by the spring 53 to be engaged with teeth 500 of the engaging portion 50.

According to the embodiment, the second movable bracket 31 has a reclining structure 5 to be able to keep the head rest body 3 to any desired reclined position relative to the seat back. It is also possible to provide the rack portion on the head rest body and pinion gear on the stay.

Various modifications and advantages will be made in the invention without departing from the scope of spirit of the invention.

What is claimed is:

1. An adjustable headrest apparatus for a vehicle seat, comprising:
   a seat back frame;
   a stay member, having a pair of lateral portions, fixedly connected to and extendign from said seat back frame;
   first and second guide shoes slidably coupled to respective ones of said pair of lateral portions of said stay member;
   a headrest body including first and second movable brackets connected to respective ones of said first and second guide shoes, said first and second movable brackets being connected to one another by a rod portion having a central axis;
   drive means, operably connected to said headrest body, for moving said first and second brackets and said rod portion relative to said pair of lateral portions of said stay to selectively adjust the height of said headrest body relative to said seat back frame, said drive means including a rotatable shaft portion having a central axis, said axis of said shaft portion being aligned with said axis of said rod portion, and gear means disposed on one end thereof for engaging a rack portion configured on one of said pair of lateral portions of said stay; and
   means for rotating said headrest body about said central axis of said rod portion to selectively adjust the inclination of said headrest body relative to said stay member.

2. The headrest apparatus of claim 1, wherein said drive means further includes spring coupler means, operably connected to said shaft, for detachably locking said gear means in a selected position relative to said rack portion to hold said headrest body in a desired position relative to said stay member.

3. The head rest apparatus of claim 1, wherein said rotating means includes detent means for detachably locking said headrest body at a desired inclination relative to said stay member.

* * * * *